Patented Oct. 18, 1949

2,485,485

UNITED STATES PATENT OFFICE 2,485,485

PROCESSES FOR REMOVING ANIONS FROM FLUID MEDIA

James R. Dudley, Cos Cob, Conn., assignor to American Cyanamid Company, New York, N. Y., a corporation of Maine No Drawing. Application June 27, 1946, Serial No. 679,872

7 Claims. (Cl. 210—24)

This invention relates to the extraction of anions from fluid media and to resinous anion active materials.

An object of this invention is to provide a synthetic resinous material having a relatively high anion capacity and which is substantially insoluble.

Another object of this invention is to provide a process for the removal of anions from fluid media and particularly aqueous solutions.

These and other objects are attained by condensing an aldehyde with a polyamine and insolubilizing materials reactive with aldehyde including a urea, and by bringing a fluid containing anions into contact with the resulting product.

The following examples in which the proportions are in parts by weight are given by way of illustration and not in limitation.

Example 1

| | Parts |
|---|---|
| Formalin (37% formaldehyde in water) | 81 |
| Urea | 30 |
| Triethanolamine | 2 |
| Water | 200 |

These substances are placed in a suitable reaction vessel provided with an agitator and heated for about ½ hour to produce an aqueous syrup. About 95 parts of tetraethylene pentamine are added and after an additional ½ hour about 6 parts of formalin are added, the syrup becoming very viscous during this addition. About 100 parts of water are introduced into the mixture in order to reduce the viscosity, after which about 61 additional parts of formalin are admixed with the syrup, thereby producing a solution which is quite fluid. After about 15 minutes 63 parts of melamine are introduced into the mixture and about 121 parts of formaldehyde are added after a short time. The mixture is then heated at about 80° C. for another half hour and acidified with about 83 parts of hydrochloric acid (37% HCl in water). The solution which is red-colored sets to a soft gel in about 10 minutes and becomes somewhat harder upon standing. This gel is ground to a convenient size such as about the size of a pea and dried for 16 hours at about 50° C. and for an additional 5 hours at 100° C. The dried product is ground and screened so that the bulk of the material goes through 24 mesh and remains on 30 mesh screens and the ground material may then be thoroughly washed with water, with dilute alkali and again with water, preferably distilled water. The packed density of the product is about 24.4 pounds per cubic foot.

A filter bed is prepared by filling a cylinder with the material produced above which has been wet with water. Water containing a relatively low concentration of hydrochloric acid (e. g., 0.01%) is passed through the bed slowly. The effluent remains approximately neutral and there is no test for chloride ions until the bed is exhausted. At this point the bed has absorbed acid the equivalent of about 10,000–15,000 grains of calcium carbonate per cubic foot of resin. This value is generally designated as the capacity of the active material.

After the bed is exhausted it may be regenerated or reactivated by washing it with a dilute alkaline solution, e. g., a 2% aqueous solution of sodium carbonate, sodium hydroxide, etc., followed by a distilled water wash to remove the retained alkaline solution whereupon the bed is then ready for another cycle.

Example 2

| | Parts |
|---|---|
| Formalin (37% formaldehyde in water) | 405 |
| Urea | 90 |
| Triethanolamine | 5 |

This mixture is heated as in Example 1 until the mixture is homogeneous and a mixture of about 95 parts of tetraethylene pentamine and 100 parts of water are added to the syrup at about 20° C. The temperature of the syrup during this addition rises to about 65° C. and after 10 minutes about 90 parts of hydrochloric acid (37% HCl in water) are added to the syrup. The temperature is raised to about 90° C. and after about 40 minutes, a soft, rubbery, transparent gel is formed. After standing 2 hours, during which time the gel hardens somewhat, it is broken up and air dried for about 5 hours after which it is placed in an oven and dried for about 16 hours at around 50° C. followed by a further heat treatment at about 100° C. for 7 hours. The dried material is ground, screened and further processed according to Example 1. The resulting product has a packed density of about 15.9 pounds per cubic foot and exhibits a capacity equivalent to about 11,000–15,000 grains of calcium carbonate per cubic foot.

Example 3

| | Parts |
|---|---|
| Formalin (37% formaldehyde in water) | 324 |
| Urea | 120 |
| Triethanolamine | 3 |

A urea-formaldehyde resin syrup is prepared by refluxing the urea and formalin to which the triethanolamine has been added in order to render it alkaline. After about ½ hour about 95 parts of tetraethylene pentamine are added slowly. A vigorous reaction takes place and the syrup becomes red. After the syrup is refluxed an additional half hour, about 121 parts of formalin are added and after still another half hour of refluxing, an additional 121 parts of formalin are added and the refluxing continued for one more hour. The syrup is acidified with about 96 parts of hydrochloric acid (37% HCl in water) and after standing about ½ hour the syrup sets to a soft, rubbery, red gel. This gel is broken up and dried for about 20 hours at around 50° C. and further heat treated for 22 hours at 100° C. The dried material which is brown colored is ground, screened and further processed according to Example 1. The resulting product has a packed density of about 23.4 pounds per cubic foot and exhibits an average capacity equivalent to about 10,000 grains of calcium carbonate per cubic foot of resin.

Example 4

|  | Parts |
|---|---|
| Formalin (37% formaldehyde in water) | 304 |
| Urea | 60 |
| Triethanolamine | 3 |

The urea is dissolved in the formalin which has been neutralized with the triethanolamine and a solution of about 73 parts of triethylene tetramine in about 100 parts of water is added to the syrup, at about 30° C. The temperature rises to 60° C. and it is maintained at this point for about 10 minutes and agitated during this time. The syrup is acidified with about 83 parts of hydrochloric acid (37% HCl in water) and the temperature of the syrup is raised to about 90° C., a soft, rubbery, red, brittle gel forming in about 12 hours. This gel is broken up and dried for about 16 hours at around 60° C. and for an additional 6 hours at about 100° C. The dried material is ground, screened and further processed according to Example 1. The resulting product has a packed density of about 17.1 pounds per cubic foot and exhibits a capacity equivalent to about 10,000–16,000 grains of calcium carbonate per cubic foot of resin.

Example 5

|  | Parts |
|---|---|
| Formalin (37% formaldehyde in water) | 385 |
| Urea | 90 |
| Triethanolamine | 5 |

An aqueous solution of about 73 parts of triethylene tetramine in 100 parts of water are added to a syrup produced by dissolving the urea and the formalin, all as in the preceding example. About 78 parts of hydrochloric acid (37% HCl in water) are added to the resulting syrup and in about 20 minutes a soft, red, transparent, rubbery gel is formed. This gel is broken up and air dried for about 5 hours and then dried for about 16 hours at 50° C. followed by an additional heat treatment at 100° C. for about 7 hours. The dried material is ground, screened and further processed according to Example 1. The resulting product has a packed density of about 18.9 pounds per cubic foot and exhibits a capacity equivalent to about 10,000–12,000 grains of calcium carbonate per cubic foot of resin.

Example 6

|  | Parts |
|---|---|
| Formalin (37% formaldehyde in water) | 162 |
| Urea | 60 |
| Triethanolamine | 3 |

This mixture is refluxed for ½ hour to produce a syrup and then about 52 parts of diethylene triamine are added slowly. During the addition of the diethylene triamine, a vigorous exothermic reaction takes place and the syrup becomes reddish in color. After refluxing for an additional half hour 81 parts of formaldehyde are added and the refluxing continued for still another half hour. About 42 parts of hydrochloric acid (37% HCl in water) are added to the syrup and the syrup sets to a soft rubbery red gel within a few hours to 3 days time. This gel is broken up and dried for about 24 hours at around 50° C. The dried material is ground, screened and further processed according to Example 1. The resulting product has a packed density of about 23.2 pounds per cubic foot and exhibits an average capacity equivalent to about 10,650 grains of calcium carbonate per cubic foot of resin.

Example 7

|  | Parts |
|---|---|
| Formalin (37% formaldehyde in water) | 284 |
| Urea | 60 |
| Triethanolamine | 3 |

The urea is dissolved in the formalin to which the triethanolamine has been added. An aqueous solution of about 52 parts of diethylene triamine dissolved in about 100 parts of water is added to the urea-formaldehyde syrup, the temperature rising to about 60° C. at which point it is maintained for about 10 minutes and during which time it is agitated. About 66 parts of hydrochloric acid (37% HCl in water) are added to the resulting syrup and the latter is heated to about 90° C. After about 10 minutes a yellow rubbery gel is formed which after standing about ½ hour is ground and spread on a tray to air dry for approximately 2 hours. The gel is then placed in an oven and dried at about 60° C. for about 16 hours and further heat treated at about 100° C. for 7 hours. The dried material is ground, screened and further processed according to Example 1. The resulting product has a packed density of about 19.3 pounds per cubic foot and exhibits a capacity equivalent to about 8,000–13,000 grains of calcium carbonate per cubic foot of resin.

Example 8

|  | Parts |
|---|---|
| Formalin (37% formaldehyde in water) | 263 |
| Urea | 60 |
| Triethanolamine | 4 |

The urea is dissolved in the formalin and then about 43 parts of an aqueous solution of ethylene diamine (70.1% ethylene diamine) are added to the urea-formaldehyde syrup at about 20° C. The temperature of the syrup rises to about 70° C. and it is maintained at this point for about 10 minutes and acidified with about 30 parts of hydrochloric acid (37% HCl in water). This syrup is heated to about 90° C. and after about 15 minutes at this temperature a soft rubbery, orange-colored gel is formed. After this gel stands for about ½ hour it is broken up and spread on a tray to air dry for about 4 hours. The gel is then dried in an oven at around 55° C. for about 16 hours followed by an additional heat treatment at 100° C. for 6 hours. The dried material is ground, screened and further processed according to Example 1. The resulting product has a packed density of about 21.6 pounds per cubic foot and exhibits a capacity equivalent to about 4000–6000 grains per cubic foot of resin.

While urea-formaldehyde resins are generally preferred as the insolubilizing agent, other amino plastics may be used, such as, for example, the condensation products of the ureas which may include urea itself, thiourea, alkyl ureas such as ethyl urea, etc., with an aldehyde, e. g., formaldehyde, acetaldehyde, propionaldehyde, butyraldehyde, benzaldehyde, cinnamyl aldehyde, furfural, etc. Polymers of formaldehyde or substances which yield formaldehyde may be used in place of formaldehyde itself. Furthermore, various mixtures of aldehyde or mixtures of the ureas may be employed.

In some instances, other insolubilizing materials may be used in conjunction with the urea-aldehyde condensation products, e. g., aminotriazinealdehyde condensation products such as melamine-formaldehyde condensation products, phenol- and cresol-formaldehyde condensation products, dicyandiamide-formaldehyde condensation products, etc. In some instances it may be desirable to react other substances with formaldehyde in conjunction with the polyamine and the urea, e. g., aminotriazines such as melamine, phenol, aniline, phenylene diamine, dicyandiamide, guanidine and its salts, alkyl and aryl guanamines, etc. Other materials which show good anion activity when condensed with formaldehyde may also be included in the compositions, e. g., biguanide, guanyl urea, guanidine, etc.

Polyamines suitable for use according to this invention include: ethylene diamine, trimethylene dimaine, tetramethylene diamine, pentamethylene diamine, hexamethylene diamine, and the polyethylene polyamines, e. g., diethylene triamine, triethylene tetramine, tetraethylene pentamine, etc. Partially acylated and partially alkylated polyamines may also be used, e. g., the mono- and dibenzoyl derivatives, the mono- and disulfanilic acid derivatives, the mono- and diacetyl derivatives, the mono- and dibutyryl derivatives, etc., of the foregoing amines. Triacylated, trialkylated or higher substitution products of the polyamines may be employed in some instances where there are a sufficient number of free reactive amino groups to form resinous condensation products with formaldehyde. Various mixtures of the polyamines and especially mixtures of the polyethylene polyamines may be utilized.

The polyamines are preferably condensed with formaldehyde but if desired any aldehyde may be utilized, for example, those mentioned in connection with the aminotriazines above. It is also possible to use different aldehydes for the condensation of the polyamine and the aminotriazine. In this case, however, the initial condensation of the aminotriazine and polyamine should be carried out separately.

The term "polyamines" as used herein is intended to cover only those polyamines wherein the amino groups are connected to the other amino groups by means of aliphatic linkages, or in other words, they are alkylene polyamines since they have alkylene groups between two amino groups, or a plurality of alkylene groups separating three or more amino groups one from another. In the claims the term "alkylene polyamine" is intended to cover such amines but also to include N-alkyl and N-aryl substituted polyamines.

My condensation products may be produced by any suitable method or with any desired combining ratio of aldehyde to the mixture of reactive materials including polyamine and urea. I have found that in general the optimum ratio of formaldehyde to reactive materials can be computed on the basis of 1 mol of formaldehyde to each 2 mols of active hydrogen attached to nitrogen in the reactive materials. Thus, for example, urea has four active hydrogens and diethylene triamine has five active hydrogens and accordingly two mols of formaldehyde are used for each mol of urea and in addition 2½ mols of formaldehyde are used for each mol of diethylene triamine. Similar proportions are used with other polyamines in accordance with the number of active hydrogens which they possess. Generally it has been found that the molal ratio of formaldehyde to the reactive materials should not be too high as otherwise good gels are not easily obtainable.

The initial condensation of the polyamine with formaldehyde is carried out at a pH between about 6–11 although more preferably at a pH between 7–10. The urea with or without aminotriazine may be condensed with the formaldehyde simultaneously or it may be condensed separately by reacting a urea with a formaldehyde solution conveniently at a pH of about 7–9. If the urea (with or without melamine or other aminotriazine) and polyamine be reacted with the formaldehyde separately the solutions of each of the condensation products are combined to form a homogeneous solution of the mixed condensation products. The initial condensation is preferably carried out at temperatures in the neighborhood of 65°–90° C. although in some instances it may be desirable to use temperatures as low as room temperature or as high as the reflux temperature.

The initial condensation product prepared in accordance with the preceding paragraph is gelled by adding sufficient acid to lower the pH below 4 and preferably to around 2–3. It is desirable that a strong acid be used for this purpose although virtually any acid which will lower the pH to the desired point may be employed. Hydrochloric acid is especially suitable for the acid gelation while other examples of suitable acids include sulfuric acid, phosphoric acid, formic acid, acetic acid, etc. The gelation of the condensation product usually occurs at temperatures ranging from room temperature up to around 90° C. in from a few minutes to a few hours. When the gel first forms it is usually relatively soft, but after aging the gel gradually becomes harder. Accordingly, the gel may be permitted to age for a day or two if a harder gel than that originally obtained be desired.

The gel is generally ground or broken into small pieces, spread on trays, dried and cured. The drying and curing may be carried out more or less simultaneously, preferably at gradually increasing temperatures. Thus the gel may be air dried for a few hours at room temperature (although this is optional), dried at about 50° C. for from 2 hours to about 1 day and finally at about 100° C. for from about 1 hour to 1 day. During the drying the resin gel cures at temperatures ranging from about 50° C. to about 160° C. To obtain a satisfactory cure the temperature should be maintained within that range for at least ½ hour. If relatively low curing temperatures be used the time will necessarily be longer than the time required at the higher temperatures to obtain the same degree of cure.

The condensation reaction may be carried out by simultaneously reacting the polyamine, the insolubilizing material including urea and aldehyde or the polyamine and insolubilizing material including urea may be reacted with the aldehyde separately or one of these substances may be added to the other substance with the aldehyde at any stage of the process.

Sufficient ion active material should be included to provide a material having a substantial anion active capacity. For this purpose the amount required varies widely with the solubility of the particular anion active material used, the activity of the concentration of the anionic materials in the fluids to be treated, etc. In general, a molal ratio of the polyamine to the other aldehyde-reactive component including a urea should preferably be between about 1:2 and 1:5.

My resins are essentially aldehyde condensation products of a polyamine and a urea, that is to say, the molal ratio of polyamine to any other active component is at least 1:1 and the molal ratio of urea to any other insolubilizing aldehyde-reactive component, e. g., melamine, is also at least 1:1.

My anion-active resins have the capacity for the extraction of anions from fluid media equivalent to about 10,000–15,000 grains of calcium carbonate per cubic foot of resin.

My anion-active materials are suitable for the extraction of all kinds of acids and anions in general. Thus they may be utilized to extract the strong mineral acids (preferably in relatively low concentrations), organic acids such as acetic acid, oxalic acid, etc. The anions of salts such as the chloride ion from ammonium chloride may also be removed by means of my resinous materials.

My products are useful for many purposes, examples of which are: water softening, acid removal from water, acid removal from alcohol solutions, etc., purification of sugar juices, etc. My resins are especially suitable for the removal of acids, both organic and inorganic, from aqueous media. Apparently any acid, soluble in water may be separated by means of my resins in the manner described above. Furthermore, my resins may be used to extract acids from fluid media other than water and may even be used for the extraction of acids from vapors. My resins may also be used as culture media for growing plants.

The term "granular" as used herein is intended to cover materials sufficiently finely divided to be effective as a fluid purification material which means that the particles must not be so small as to pack unduly or so large that the surface area is too small for good efficiency. Generally, particle sizes between 8 and 60 mesh are suitable.

This application is a continuation-in-part of my application Serial No. 407,096, filed August 15, 1941, and also of my application Serial No. 442,281, filed May 8, 1942, both of which have become abandoned.

Obviously many modifications and variations in the processes and compositions described above may be made without departing from the spirit and scope of the invention as defined in the appended claims.

I claim:

1. A process for removing anions from fluid media which comprises contacting a fluid medium containing anions with an anion active material including a substantial proportion of an anion active, substantially water and dilute acid insoluble, granular, cured resin comprising an alkylene polyamine-aldehyde condensation product wherein the amino groups of the polyamine are connected by aliphatic linkages and the amino groups of said polyamine have at least one hydrogen atom attached to each of the nitrogen atoms before condensation with said aldehyde, said condensation product normally having substantial water and dilute acid solubility but being insolubilized by interpolymerization with an aldehyde condensation product of urea, said insoluble, granular, cured resin being essentially an aldehyde condensation product of an alkylene polyamine and urea in which the molar ratio of alkylene polyamine to urea is from 1:2 to 1:5, and thereafter separating the fluid medium from said anion active material.

2. A process for removing anions from fluid media which comprises contacting a fluid medium containing anions with an anion active material including a substantial proportion of an anion active, substantially water and dilute acid insoluble, granular, cured resin comprising a polyalkylene polyamine-aldehyde condensation product wherein the amino groups of the polyamine are connected by aliphatic linkages and the amino groups of said polyamine have at least one hydrogen atom attached to each of the nitrogen atoms before condensation with said aldehyde, said condensation product normally having substantial water and dilute acid solubility but being insolubilized by interpolymerization with an aldehyde condensation product of urea, said insoluble, granular, cured resin being essentially an aldehyde condensation product of a polyalkylene polyamine and urea in which the molar ratio of polyalkylene polyamine to urea is from 1:2 to 1:5, and thereafter separating the fluid medium from said anion active material.

3. A process for removing anions from fluid media which comprises contacting a fluid medium containing anions with an anion active material including a substantial proportion of an anion active, substantially water and dilute acid insoluble, granular, cured resin comprising a polyethylene polyamine-aldehyde condensation product wherein the amino groups of the polyamine are connected by aliphatic linkages and the amino groups of said polyamine have at least one hydrogen atom attached to each of the nitrogen atoms before condensation with said aldehyde, said condensation product normally having substantial water and dilute acid solubility but being insolubilized by interpolymerization with a urea-formaldehyde condensation product, said insoluble, granular, cured resin being essentially an aldehyde condensation product of a polyethylene polyamine and urea in which the molar ratio of polyethylene polyamine to urea is from 1:2 to 1:5, and thereafter separating the fluid medium from said anion active material.

4. A process for removing anions from fluid media which comprises contacting a fluid medium containing anions with an anion active material including a substantial proportion of an anion active, substantially water and dilute acid insoluble, granular, cured resin comprising a polyethylene polyamine-formaldehyde condensation product wherein the amino groups of the polyamine are connected by aliphatic linkages and the amino groups of said polyamine have at least one hydrogen atom attached to each of the nitrogen atoms before condensation with formaldehyde, said condensation product normally having substantial water and dilute acid solubility but being insolubilized by interpolymerization with a urea-formaldehyde condensation product, said insoluble, granular, cured resin being essentially a formaldehyde condensation product of a polyethylene polyamine and urea in which the molar ratio of polyethylene polyamine to urea is from 1:2 to 1:5, and thereafter separating the fluid medium from said anion active material.

5. A process for removing anions from fluid media which comprises contacting a fluid medium containing anions with an anion active material including a substantial proportion of an anion active, substantially water and dilute acid insoluble, granular, cured resin comprising a polyethylene polyamine-formaldehyde condensation product wherein the amino groups of the polyamine are connected by aliphatic linkages and the amino groups of said polyamine have at least one hydrogen atom attached to each of the nitrogen atoms before condensation with formaldehyde, said condensation product normally having substantial water and dilute acid solubility but being insolubilized by interpolymerization with a formaldehyde condensation product of urea and melamine in which the molar ratio of urea to melamine is at least 1:1, said insoluble, granular, cured resin being essentially a formaldehyde condensation product of a polyethylene polyamine, urea, and melamine in which the molar ratio of polyethylene polyamine to urea and melamine is from 1:2 to 1:5, and thereafter separating the fluid medium from said anion active material.

6. A process for removing anions from aqueous media which comprises contacting an aqueous medium containing anions with an anion active material including a substantial proportion of an anion active, substantially water and dilute acid insoluble, granular, cured resin comprising a polyethylene polyamine-formaldehyde condensation product wherein the amino groups of the polyamine are connected by aliphatic linkages and the amino groups of said polyamine have at least one hydrogen atom attached to each of the nitrogen atoms before condensation with formaldehyde, said condensation product normally having substantial water and dilute acid solubility but being insolubilized by interpolymerization with a urea-formaldehyde condensation product, said insoluble, granular, cured resin being essentially a formaldehyde condensation product of a polyethylene polyamine and urea in which the molar ratio of polyethylene polyamine to urea is from 1:2 to 1:5, and thereafter separating the aqueous medium from said anion active material.

7. A process for removing acids from aqueous media which comprises contacting an aqueous medium containing an acid with an anion active material including a substantial proportion of an anion active, substantially water and dilute acid insoluble, granular, cured resin comprising a polyethylene polyamine-formaldehyde condensation product wherein the amino groups of the polyamine are connected by aliphatic linkages and the amino groups of said polyamine have at least one hydrogen atom attached to each of the nitrogen atoms before condensation with formaldehyde, said condensation product normally having substantial water and dilute acid solubility but being insolubilized by interpolymerization with a urea-formaldehyde condensation product, said insoluble, granular, cured resin being essentially a formaldehyde condensation product of a polyethylene polyamine and urea in which the molar ratio of polyethylene polyamine to urea is from 1:2 to 1:5, and thereafter separating the aqueous medium from said anion active material.

JAMES R. DUDLEY.

REFERENCES CITED

The following references are of record in the file of this patent:

UNITED STATES PATENTS

| Number | Name | Date |
|---|---|---|
| 1,779,047 | Ripper | Oct. 21, 1930 |
| 2,223,930 | Griessbach | Dec. 3, 1940 |
| 2,251,234 | Swain | July 29, 1941 |
| 2,259,169 | Little | Oct. 14, 1941 |
| 2,285,750 | Swain | June 9, 1942 |
| 2,325,375 | D'Alelio | July 27, 1943 |
| 2,333,754 | Wassenegger | Nov. 9, 1943 |
| 2,334,545 | D'Alelio | Nov. 16, 1943 |
| 2,388,235 | Bowman | Nov. 6, 1945 |

FOREIGN PATENTS

| Number | Country | Date |
|---|---|---|
| 848,653 | France | July 31, 1931 |
| 851,404 | France | Oct. 2, 1931 |

OTHER REFERENCES

Myers, Ind. and Eng. Chem., vol. 33, pp. 697–706, June 1941.